US006611504B1

(12) United States Patent
Kanda et al.

(10) Patent No.: US 6,611,504 B1
(45) Date of Patent: Aug. 26, 2003

(54) MOBILE WIRELESS DEVICE

(75) Inventors: Makoto Kanda, Kanagawa (JP); Yoshio Koyanagi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/394,602

(22) Filed: Sep. 13, 1999

(30) Foreign Application Priority Data

Oct. 8, 1998 (JP) .......................................... 10-300310

(51) Int. Cl.[7] .......................... H01Q 1/32; H01Q 13/12; H04B 7/00

(52) U.S. Cl. ........................ 370/310; 343/702; 343/718; 343/769; 379/447; 455/66

(58) Field of Search ............................ 455/66, 90, 347, 455/550, 130; 370/310; 379/447, 449, 450, 455, 428.01; 343/702, 714, 728, 732, 764, 769, 842, 866, 718

(56) References Cited

U.S. PATENT DOCUMENTS 3,745,583 A * 7/1973 Herbert ...................... 343/742
5,014,070 A * 5/1991 Stock et al. .................... 342/3
5,564,082 A * 10/1996 Blonder et al. ............. 343/718
6,188,362 B1 * 2/2001 Igarashi ...................... 343/702

FOREIGN PATENT DOCUMENTS

| | | | |
|---|---|---|---|
| CN | 1046808 | A | 11/1990 |
| GB | 2 248 330 | A | 4/1992 |
| JP | 6250979 | A | 9/1994 |
| JP | 7273686 | A | 10/1995 |

OTHER PUBLICATIONS

Patent Abstracts of Japan, Publication No. 06334557, Publication Date Dec. 2, 1994.
Patent Abstracts of Japan, Publication No. 09289671, Publication Date Apr. 23, 1996.

* cited by examiner

*Primary Examiner*—Alpus H. Hsu
*Assistant Examiner*—Afsar M Qureshi
(74) *Attorney, Agent, or Firm*—Pearne & Gordon LLP

(57) ABSTRACT

The mobile wireless device of the present invention comprises: the wireless device main body 1; the antenna element 2 provided in the case; the hand strap connection portion 3 to connect the hand strap 4 to the vicinity of the antenna element 2; and the hand strap 4 which is made of conductive material and is formed into a ring shape. As the result, when the hand strap 4 which is made of conductive material and is formed into a ring shape, is attached, the hand strap 4 and the antenna element 2 are electro-magnetically coupled, and thereby, the antenna has a high gain.

6 Claims, 3 Drawing Sheets

MOBILE WIRELESS DEVICE

BACKGROUND OF THE INVENTION

The present invention relates to a mobile wireless device, and particularly to a mobile wireless device structured in such a manner that a hand strap and a built-in antenna element are electro-magnetically coupled with each other and form a high gain antenna.

FIG. 8 is a view showing the structure of the conventional mobile wireless device. In FIG. 8, the mobile wireless device comprises a wireless device main body 21, antenna element 22, hand strap connection portion 23, and hand strap 24.

In FIG. 8, the hand strap 24 is structured by either one of fiber fabric or synthetic resin, or composition of them, and is formed into a ring shape.

In the conventional mobile wireless device, the hand strap 24 is, as described above, structured into a ring-like one formed of any one of, or composite of fiber fabric, fiber knitted goods, or synthetic resin, and does not affect the electric characteristic of the antenna element 22 structured inside the wireless device main body 21. Accordingly, when a size of the antenna element 22 is reduced, the gain of the antenna is deteriorated, which is a problem.

SUMMARY OF THE INVENTION

The present invention is attained to solve the above-described problem, and an object of the present invention is to provide a mobile wireless device in which the hand strap and the antenna element are electro-magnetically coupled, and a high gain antenna is obtained.

In order to solve the above-described problem, in a mobile wireless device, the present invention is characterized in that an antenna element is provided inside a case of a wireless device main body, a hand strap connection portion is provided in the vicinity of the antenna element, and a hand strap which is made of conductive material and formed into a ring shape, is attached to the hand strap connection portion.

Accordingly, according to the present invention, an effect that the hand strap and the built-in antenna element are electro-magnetically coupled, thereby the antenna can have a high gain, is obtained.

DETAILED DESCRIPTION OF THE PREFERRED EMBODIMENTS

Figure 1:
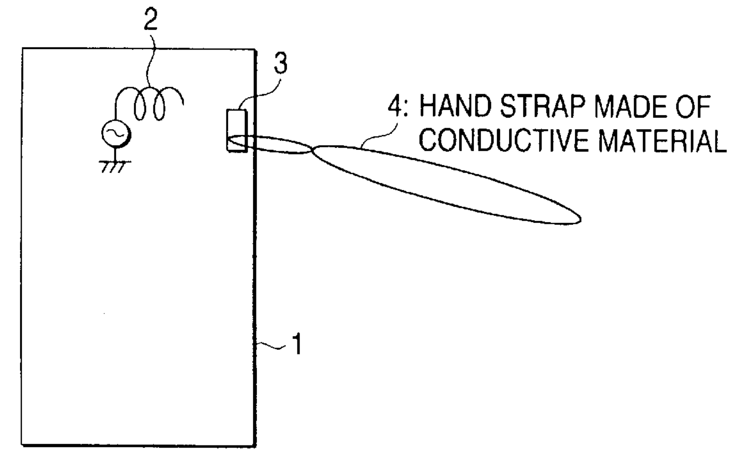
FIG. 1 is a block diagram showing the structure of a mobile wireless device in the first embodiment of the present invention.

In the invention described in Aspect 1 of the present invention is, in a mobile wireless device, an antenna element is provided inside a case of a wireless device main body, a hand strap connection portion is provided in the vicinity of the antenna element, and a hand strap which is made of conductive material and formed into a ring shape, is attached to the hand strap connection portion, therefore, an effect that the hand strap and the antenna element are electro-magnetically coupled, thereby the antenna can have a high gain, is obtained.

Further, in the invention described in Aspect 2, in a mobile wireless device, an antenna element is provided inside a resin case of a wireless device main body, a hand strap connection portion made of the same resin material as the resin case is provided in the vicinity of the antenna element, and a hand strap which is made of conductive material and formed into a ring shape, is attached to the hand strap connection portion, therefore, the structure of the connection portion is simplified, and an effect that the hand strap and the antenna element are electro-magnetically coupled, thereby the antenna can have a high gain, is obtained.

Further, in the invention described in Aspect 3, in a mobile wireless device, an antenna element is provided inside a resin case of a wireless device main body, a hand strap connection portion made of the same resin material as the resin case is provided in the vicinity of the antenna element, and a hand strap, in which a fiber cord inside of which a conductive metallic wire is passed is formed into a ring shape, is attached to the hand strap connection portion, and therefore the conductivity can be provided to the strap, and an effect that the hand strap and the antenna element are electro-magnetically coupled, thereby the antenna can have a high gain, is obtained.

Further, in the invention described in aspect 4, in a mobile wireless device, an antenna element is provided inside a resin case of a wireless device main body, a hand strap connection portion made of the same resin material as the resin case is provided in the vicinity of the antenna element, and a hand strap, in which a fiber cord on which conductive metal plating is conducted is formed into a ring shape, is attached to the hand strap connection portion, and therefore, the conductivity can be provided to the strap, the hand strap can have flexibility, and an effect that the hand strap and the antenna element are electro-magnetically coupled, thereby the antenna can have a high gain, is obtained.

Further, in the invention described in Aspect 5, in a mobile wireless device, an antenna element is provided inside a resin case of a wireless device main body, a hand strap connection portion made of the same resin material as the resin case is provided in the vicinity of the antenna element, and a hand strap, in which a cord formed by passing a fiber code, on which conductive metal plating is conducted, through the inside of a fiber cord on which conductive metal plating is not conducted, is formed into a ring shape, is attached to the hand strap connection portion, and therefore, the conductivity can be provided to the strap, the hand strap can have flexibility, the beautiful external view can be obtained, and an effect that the hand strap and the antenna element are electro-magnetically coupled, thereby the antenna can have a high gain, is obtained.

Further, in the invention described in aspect 6, in a mobile wireless device, an antenna element is provided inside a resin case of a wireless device main body, a hand strap connection portion made of the same resin material as the resin case is provided in the vicinity of the antenna element, and a hand strap, in which a cord formed by attaching a fiber cord, on which conductive metal plating is conducted, onto the rear side of a fiber fiber cord on which conductive metal plating is not conducted, is formed into a ring shape, is attached to the hand strap connection portion, and therefore, the conductivity can be provided to the strap, the hand strap can have flexibility, the beautiful external view can be obtained, and an effect that the hand strap and the antenna element are electro-magnetically coupled, thereby the antenna can have a high gain, is obtained.

Referring to the drawings, embodiments of the present invention will be described below.

FIRST EMBODIMENT

FIG. 1 shows the structure of the mobile wireless device in the first embodiment of the present invention, and in FIG. 1, the mobile wireless device comprises: the wireless device main body 1; the antenna element 2 provided in the case; the hand strap connection portion 3 to connect the hand strap 4 to the vicinity of the antenna element 2; and the hand strap 4 which is made of conductive material and is formed into a ring shape.

Figure 2:
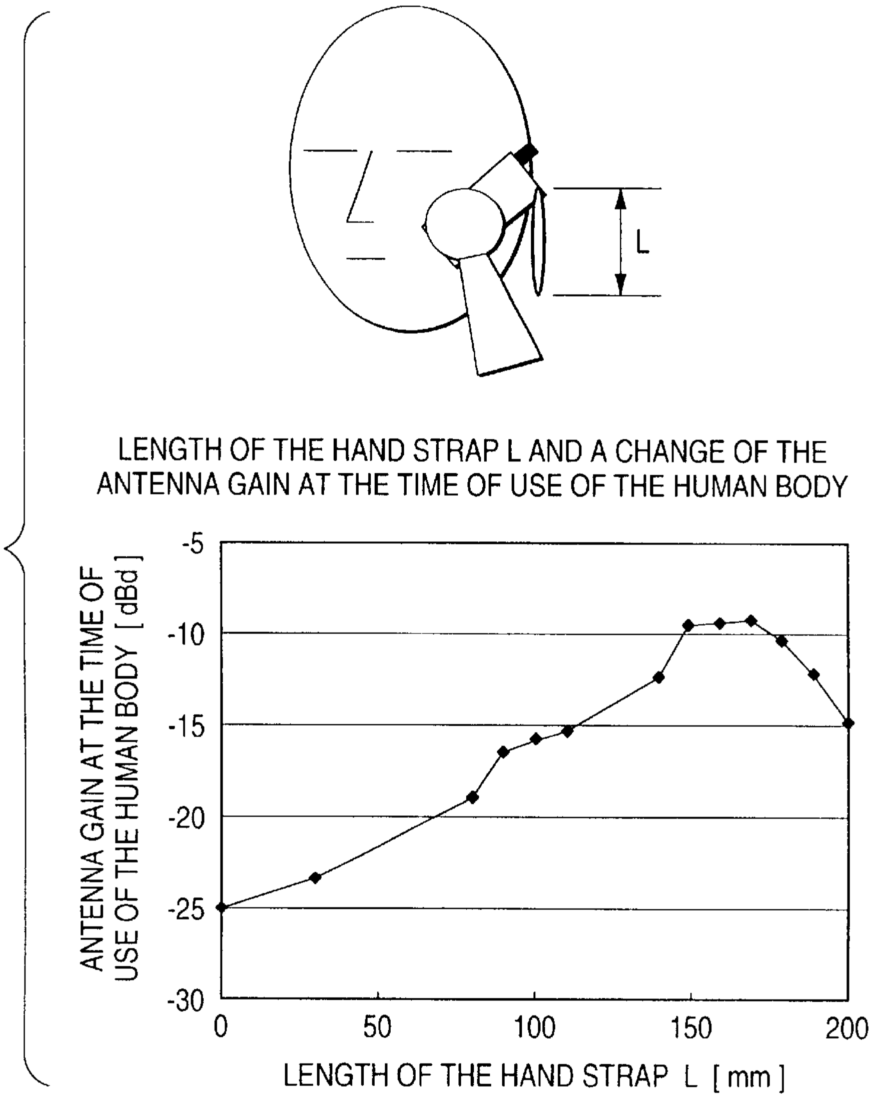
FIG. 2 is a graph showing the length of a hand strap and a change of gain at the time of use of the human body, according to the first embodiment of the present invention.

In the structure in such the first embodiment, when the length of the hand strap L and a change of the antenna gain at the time of use of the human body, are measured, the following result can be found: as shown in FIG. 2, when the electrical length of the strap (the length having the conductivity) is 150 mm, the gain of the antenna is improved by about 15 dB.

From this result, when the hand strap 4 which is made of conductive material and is formed into a ring shape, is attached to the hand strap 4 and the antenna element 2 are electro-magnetically coupled, thereby, the gain of the antenna can be increased.

SECOND EMBODIMENT

Figure 3:
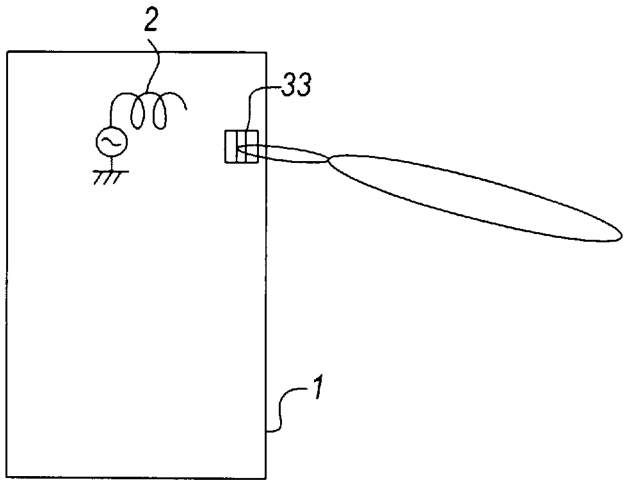
FIG. 3 is a block diagram showing the structure of the mobile wireless device in the second embodiment of the present invention.

FIG. 3 shows the structure of the mobile wireless device in the second embodiment of the present invention, and in FIG. 3, the mobile wireless device comprises: the wireless device main body 1; the antenna element 2 provided in the resin case of the wireless device main body 1; the hand strap connection portion 33 to connect the hand strap 4, made of the same resin material as the resin case of the wireless device main body, to the vicinity of the antenna element 2; and the hand strap 4 which is made of conductive material and is formed into a ring shape. As the result, when the hand strap connection portion 33 is structured by the same resin material as the resin case, the structure becomes simple, and further, when the hand strap 4 which is made of conductive material and is formed into a ring shape, is attached, the hand strap 4 and the antenna element 2 are electro-magnetically coupled, thereby, the antenna has a high gain.

THIRD EMBODIMENT

Figure 4:
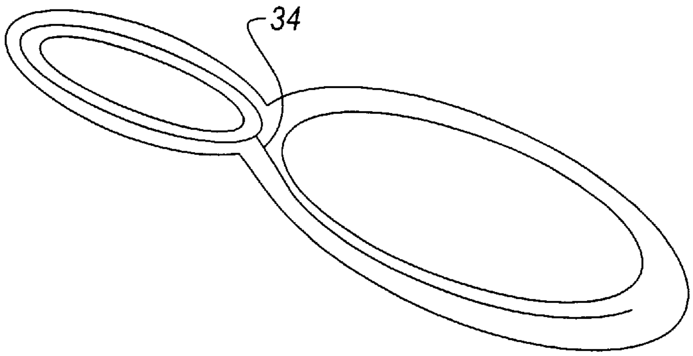
FIG. 4 is a schematic view showing the structure of a hand strap of the mobile wireless device in the third embodiment of the present invention.

FIG. 4 shows the structure of the hand strap of the mobile wireless device in the third embodiment of the present invention, and the structure not shown in FIG. 4 is the same as that in the second embodiment. In FIG. 4, the hand strap 34 is a hand strap in which a fiber cord, inside of which a conductive metallic wire is passed, is formed into rig-like. As the result, when the fiber cord, inside of which a conductive metallic wire is passed, is used, the conductivity can be provided onto the strap 34, and when the conductive hand strap 34 is attached, the hand strap 34 and the antenna element are electro-magnetically coupled, and thereby, the antenna has a high gain.

FOURTH EMBODIMENT

Figure 5:
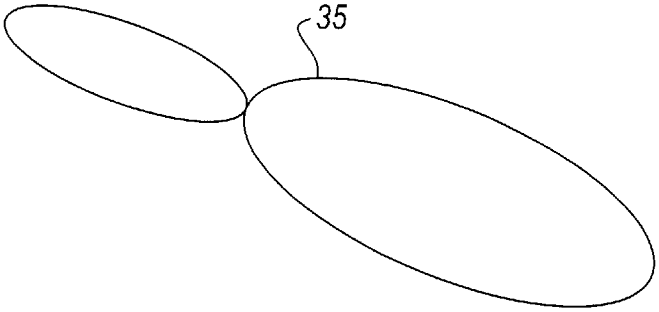
FIG. 5 is a schematic view showing the structure of a hand strap of the mobile wireless device in the fourth embodiment of the present invention.

FIG. 5 shows the structure of the hand strap of the mobile wireless device in the fourth embodiment of the present invention, and the structure not shown in FIG. 5 is the same as that in the second embodiment. In FIG. 5, the hand strap 35 is a hand strap in which a fiber cord, on which conductive metal plating is conducted, is formed into rig-like. As the result, when the fiber cord, on which conductive metal plating is conducted, is used, the conductivity can be provided onto the strap 35, and the strap 35 has the flexibility, and when the conductive hand strap 35 is attached, the hand strap 35 and the antenna element are electro-magnetically coupled, and thereby, the antenna has a high gain.

FIFTH EMBODIMENT

Figure 6:
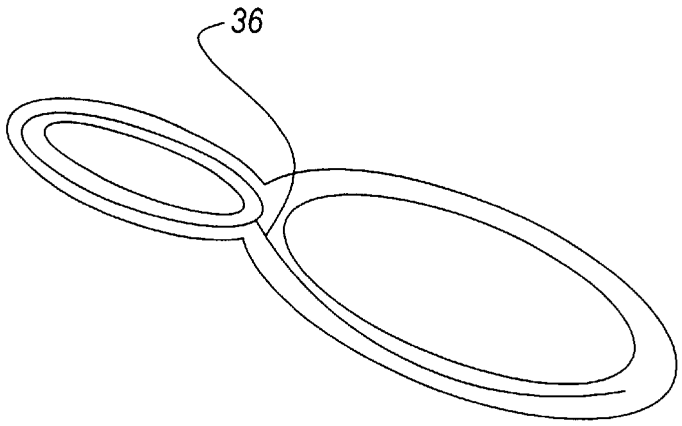
FIG. 6 is a schematic view showing the structure of a hand strap of the mobile wireless device in the fifth embodiment of the present invention.

FIG. 6 shows the structure of the hand strap of the mobile wireless device in the fifth embodiment of the present invention, and the structure not shown in FIG. 6 is the same as that in the second embodiment. In FIG. 6, the hand strap 36 is a hand 28 strap in which a cord formed by passing the fiber cord, on which conductive metal plating is conducted, through the inside of the fiber cord on which conductive metal plating is not conducted, is formed into a ring shape. As the result, when the cord 36 formed by passing the fiber cord, on which conductive metal plating is conducted, through the inside of the fiber cord on which conductive metal plating is not conducted, is used, the conductivity can be provided onto the strap 36, the strap 36 can have the flexibility, and the beautiful external view can be obtained, and in addition to that, when the conductive hand strap 36 is attached, the hand strap 36 and the antenna element are electro-magnetically coupled, and thereby, the antenna has a high gain.

SIXTH EMBODIMENT

Figure 7:
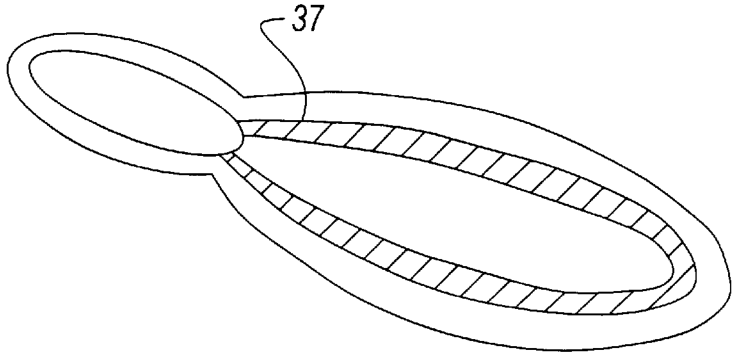
FIG. 7 is a schematic view showing the structure of a hand strap of the mobile wireless device in the sixth embodiment of the present invention.

FIG. 7 shows the structure of the hand strap of the mobile wireless device in the sixth embodiment of the present invention, and the structure not shown in FIG. 7 is the same as that in the second embodiment. In FIG. 7, the hand strap 37 is a hand strap in which a cord formed by adhering the, fiber cord, on which conductive metal plating is conducted, onto the inner surface of the fiber cord on which conductive metal plating is not conducted, is formed into a ring shape. As the result, when the cord 37 formed by adhering the fiber cord, on which conductive metal plating is conducted, onto the inner surface the fiber cord on which conductive metal plating is not conducted, is used, the conductivity can be provided onto the strap 37, the strap 37 can have the flexibility, and the beautiful external view can be obtained, and in addition to that, when the conductive hand strap 37 is attached, the hand strap 37 and the antenna element are electro-magnetically coupled, and thereby, the antenna has a high gain.

As can clearly be seen from the above description, according to the first invention, when the hand strap which is made of conductive material and formed into a ring shape, is attached, an effect that the hand strap and the antenna element are electro-magnetically coupled, thereby, the antenna has a high gain, is obtained.

Further, according to the second invention, when the hand strap connection portion is structured by the same resin material as the case, the structure becomes simple, and when the hand strap which is made of conductive material and formed into a ring shape, is attached, an effect that the hand strap and the antenna element are electro-magnetically coupled, thereby, the antenna has a high gain, is obtained.

Further, according to the third invention, when a fiber cord, through the inside of which a conductive metallic wire is passed, is used, the conductivity can be provided onto the strap, and when the conductive hand strap is attached, an effect that the hand strap and the antenna element are electro-magnetically coupled, thereby, the antenna has a high gain, is obtained.

Further, according to the fourth invention, when a fiber cord on which conductive metal plating is conducted, is used, the conductivity can be provided onto the strap, and the hand strap can have the flexibility, and when the conductive hand strap is attached, an effect that the hand strap and the antenna element are electro-magnetically coupled, thereby, the antenna has a high gain, is obtained.

Further, according to the fifth invention, when a cord formed by passing the fiber cord, on which conductive metal plating is conducted, through the inside of the fiber cord on which conductive metal plating is not conducted, is used, the conductivity can be provided onto the strap and the hand strap can have the flexibility, and the beautiful external view can also be obtained, and in addition to that, when the conductive hand strap is attached, an effect that the hand strap and the antenna element are electro-magnetically coupled, thereby, the antenna has a high gain, is obtained.

Finally, according to the sixth invention, when a cord formed by attaching a fiber code on which conductive metal plating is conducted, onto the inner surface of a fiber cord on which conductive metal plating is not conducted, the conductivity can be provided onto the strap and the hand strap can have the flexibility, and the beautiful external view can also be obtained, and in addition to that, when the conductive hand strap is attached, an effect that the hand strap and the antenna element are electro-magnetically coupled, thereby, the antenna has a high gain, is obtained.

FIG. 1

4: CONDUCTIVE CORD

FIG. 2 a: THE LENGTH L OF THE STRAP AND GAIN AT THE TIME OF USE OF THE HUMAN BODY b: LENGTH L OF THE STRAP [mm]

c: GAIN AT THE TIME OF USE OF THE HUMAN BODY [dB]

FIG. 3

33: THE CONNECTION PORTION OF THE HAND STRAP IS FORMED OF THE SAME RESIN

FIG. 4

34: A FABRIC CORD THROUGH THE INSIDE OF WHICH A CONDUCTIVE METALLIC WIRE IS PASSED

FIG. 5

35: A FABRIC CORD ON WHICH CONDUCTIVE METAL PLATING IS CONDUCTED

FIG. 6

36: A FABRIC CORD ON WHICH CONDUCTIVE METAL PLATING IS CONDUCTED, IS PASSED THROUGH THE INSIDE A FABRIC CORD ON WHICH CONDUCTIVE METAL PLATING IS NOT CONDUCTED.

FIG. 7

37: A FABRIC CORD ON WHICH CONDUCTIVE METAL PLATING IS CONDUCTED, IS ATTACHED TO THE INSIDE.

What is claimed is:

1. A mobile wireless device comprising:

a case of said wireless device main body;

an antenna element provided inside said case;

a hand strap connection portion provided in the vicinity of said antenna element; and a hand strap different from said antenna element, said hand strap which is made of conductive material and being attached to said hand strap connection portion;

wherein said antenna element and said hand strap are electro-magnetically coupled to form a high gain antenna.

2. The mobile wireless device as claimed in claim 1, wherein said case is made of resin; and said hand strap connection portion is made of the same resin material as said resin case.

3. The mobile wireless device as claimed in claim 2, wherein said hand strap, in which a fiber cord through inside of which a conductive metal wire passes, is formed into a ring shape and is attached to said hand strap connection portion.

4. The mobile wireless device as claimed in claim 2, wherein said hand strap, in which a fiber cord on which conductive metal plating is conducted, is formed into a ring shape and is attached to said hand strap connection portion.

5. The mobile wireless device as claimed in claim 2, wherein said hand strap, in which a cord formed by passing a fiber cord, on which conductive metal plating is conducted, through the inside of another fiber cord, on which conductive metal plating is not conducted, is formed into a ring shape and is attached to said hand strap connection portion.

6. The mobile wireless device as claimed in claim 2, wherein said hand strap, in which a cord formed by attaching a fiber cord, on which conductive metal plating is conducted, onto a inner surface of another fiber cord, on which conductive metal plating is not conducted, is formed into a ring shape and is attached to said hand strap connection portion.

* * * * *

UNITED STATES PATENT AND TRADEMARK OFFICE
CERTIFICATE OF CORRECTION

PATENT NO. : 6,611,504 B1
DATED : August 26, 2003

INVENTOR(S) : Makoto Kanda et al.

Figure 8:
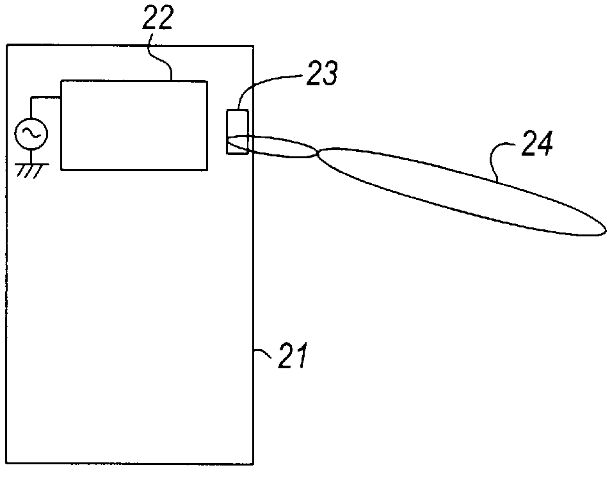
FIG. 8 is a block diagram showing the structure of the conventional mobile wireless device.
Figure 3:
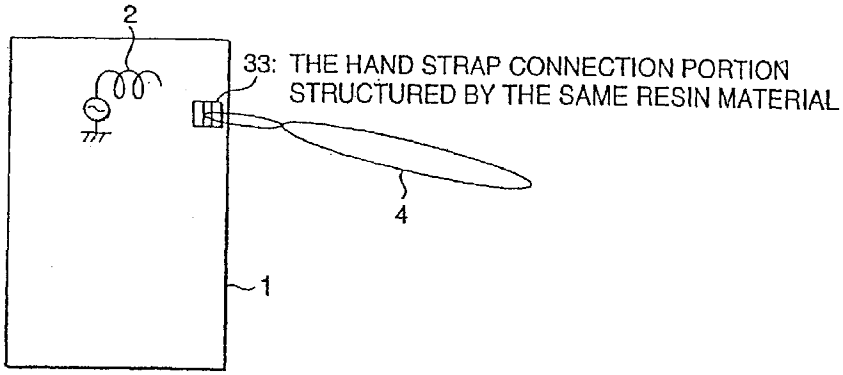
Figure 4:
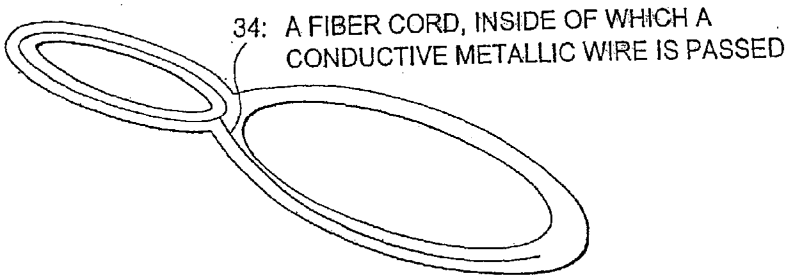
Figure 5:
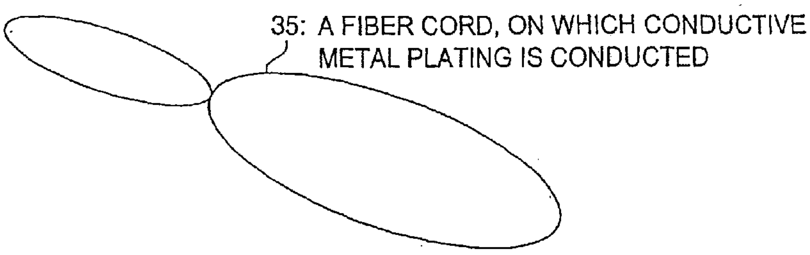
Figure 6:
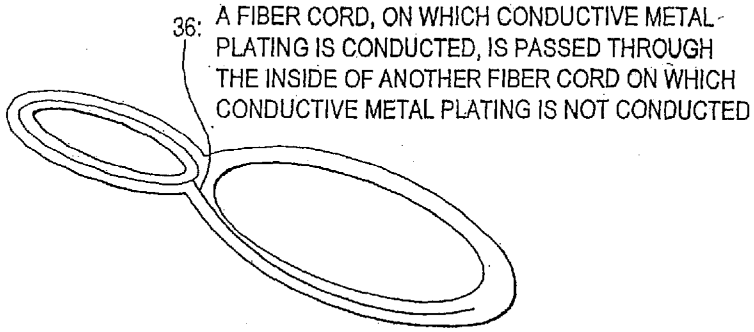
Figure 7:
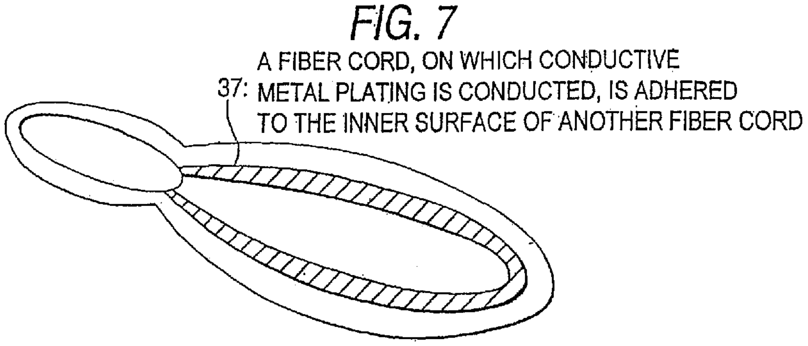
Figure 8:
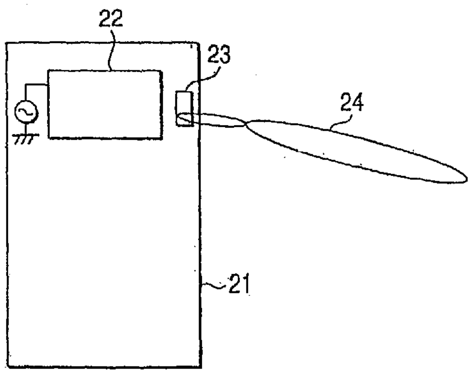

It is certified that error appears in the above-identified patent and that said Letters Patent is hereby corrected as shown below:

Drawings,
Please replace "Sheet 2 of 3", containing Figures 3-5, and "Sheet 3 of 3", containing Figures 6-8, with the attached drawings.

Column 2,
Line 59, please delete "code", and insert therefor -- cord --.

Column 3,
Line 8, please delete the second occurrence of "fiber".

Column 5,
Line 33, please delete "code", and insert therefor -- cord --.
Lines 51-52, please delete the description of Fig. 3, and insert therefor the revised description of Fig. 3 as shown on the attached drawing sheet 2/3, as follows:
-- THE HAND STRAP CONNECTION PORTION STRUCTURED BY THE SAME RESIN MATERIAL --.
Lines 54-56, please delete the description of Fig. 4, and insert therefor the revised description of Fig. 4 as shown on the attached drawing sheet 2/3, as follows:
-- A FIBER CORD, INSIDE OF WHICH A CONDUCTIVE METALLIC WIRE IS PASSED --.

Column 6,
Lines 1-2, please delete the description of Fig. 5, and insert therefor the revised description of Fig. 5 as shown on the attached drawing sheet 2/3, as follows:
-- A FIBER CORD, ON WHICH CONDUCTIVE METAL PLATING IS CONDUCTED --.
Lines 4-8, please delete the description of Fig. 6, and insert therefor the revised description of Fig. 6 as shown on the attached drawing sheet 3/3, as follows:
-- A FIBER CORD, ON WHICH CONDUCTIVE METAL PLATING IS CONDUCTED, IS PASSED THROUGH THE INSIDE OF ANOTHER FIBER CORD ON WHICH CONDUCTIVE METAL PLATING IS NOT CONDUCTED --.

UNITED STATES PATENT AND TRADEMARK OFFICE
CERTIFICATE OF CORRECTION

PATENT NO. : 6,611,504 B1
DATED : August 26, 2003
INVENTOR(S) : Makoto Kanda et al.

It is certified that error appears in the above-identified patent and that said Letters Patent is hereby corrected as shown below:

Column 6 cont'd,
Lines 10-12, please delete the description of Fig. 7, and insert therefor the revised description of Fig. 7 as shown on the attached sheet 3/3, as follows:
-- A FIBER CORD, ON WHICH CONDUCTIVE METAL PLATING IS CONDUCTED, IS ADHERED TO THE INNER SURFACE OF ANOTHER FIBER CORD --.

Signed and Sealed this

Third Day of February, 2004

JON W. DUDAS
*Acting Director of the United States Patent and Trademark Office*